March 21, 1950

C. M. NICHOLS 2,501,476

REGENERATIVE FURNACE AND METHOD
OF OPERATING THE SAME

Filed Sept. 23, 1947

INVENTOR
CHARLES M. NICHOLS,
by: Martin J. Carroll
his Attorney.

March 21, 1950 C. M. NICHOLS 2,501,476
REGENERATIVE FURNACE AND METHOD
OF OPERATING THE SAME
Filed Sept. 23, 1947 2 Sheets-Sheet 2
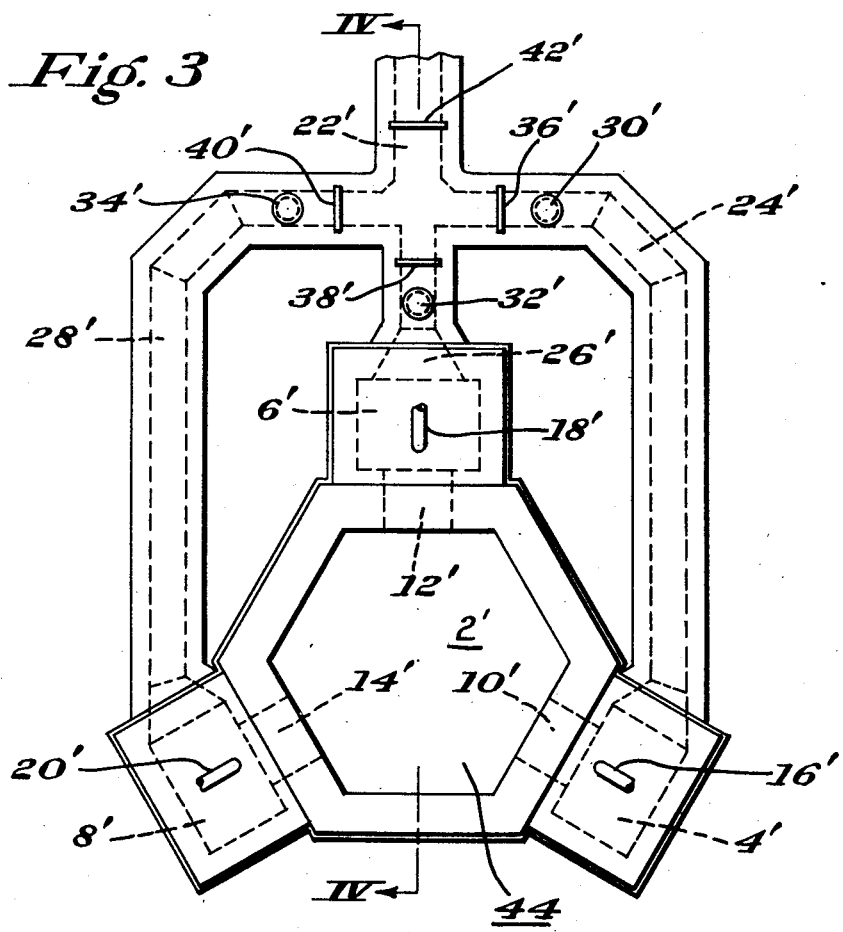
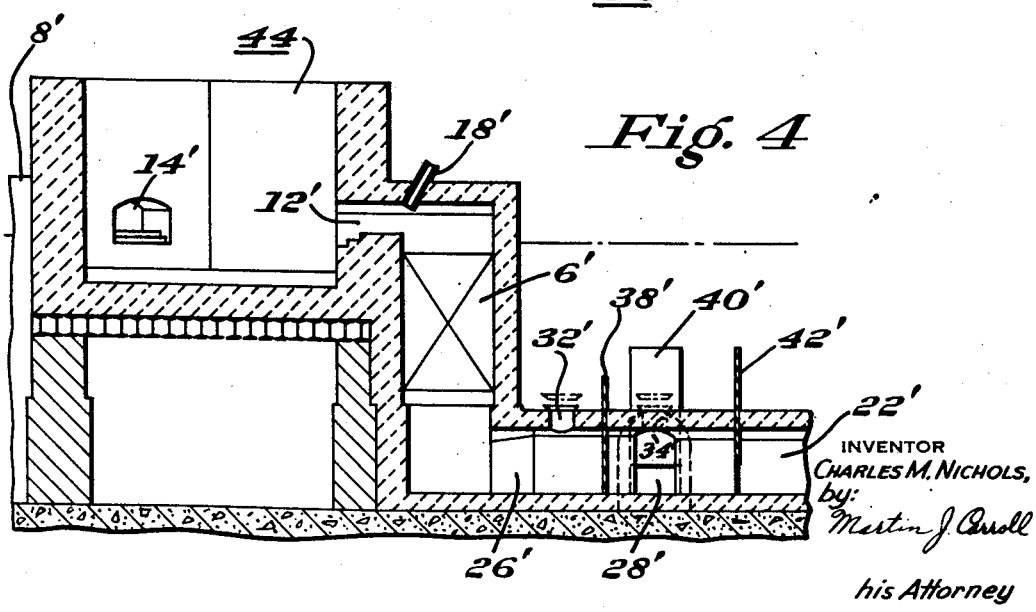
INVENTOR
CHARLES M. NICHOLS,
by: Martin J. Carroll
his Attorney Patented Mar. 21, 1950

2,501,476

UNITED STATES PATENT OFFICE 2,501,476

REGENERATIVE FURNACE AND METHOD OF OPERATING THE SAME

Charles M. Nichols, Pittsburgh, Pa.

Application September 23, 1947, Serial No. 775,626

5 Claims. (Cl. 263—15)

1

This invention relates to a regenerative furnace and the method of operating the same. Regenerative furnaces now in use are provided with two sets of regenerators or checker chambers of equal capacity and in firing the furnace the air enters through one set of checker chambers and the flue gases pass out through the second set. After a period of time the firing is reversed so that the air enters the second set of checker chambers and the flue gas passes out through the first set. Each set of checker chambers may consist of one or more units with the total capacity of the units being equal in each set. In designing a furnace of this type the checker chambers, the furnace proper or combustion chamber, and the flues from the checker chambers to the stack can be fairly accurately designed to meet the requirements of the desired capacity of the furnace. However, the size of the ducts connecting the checker chamber to the furnace hearth or combustion chamber cannot be designed to have maximum efficiency under all conditions. This is due to the fact that these ducts act alternately as air ports for the introduction of air into the furnace and as flues for the burned gases. If the design is made exclusively for the purpose of obtaining intimate mixture of the fuel with preheated air and good flame characteristics, the Reynolds number at low firing rates should exceed 2100. This number is obtained by dividing the product of air density, hydraulic diameter and velocity of preheated air by its viscosity. Of these four factors only the velocity and hydraulic diameter can be controlled by the designer. If the Reynolds number falls below 2100, the flow is streamlined and mixing of the air with the fuel will not occur. If the Reynolds number is between 2100 and approximately 4000 the flow is viscous and the mixing of the preheated air with the fuel is partial. The flame will also be unsatisfactory both as to quality and direction. However, if the Reynolds number is at least substantially 4000 the flow will be turbulent resulting in good mixing of the fuel with the preheated air and the flame will be luminous and have proper direction. However, since these ducts also act as flues, very definite complications arise in attempting to obtain this turbulent flow. The volume of the products of combustion exhausting from the furnace is about twice as great as the volume of preheated air entering, this being due to the rise in temperature of the air and fuel and the infiltration of external air into the furnace. Therefore, if the ducts are properly

2 designed to function as air ducts, the velocity of the flue gases will be approximately twice the velocity of the air. This velocity may be obtained by high stack draft or by building up a slight pressure at the exit end of the furnace to assist in forcing the products of combustion toward the checker chamber. These expedients are harmful, the first because cold air is drawn into the checkers from the outside, thus cooling the products of combustion and lowering the temperature of the checker brick. Also in some cases channeling of the products of combustion through the checkers results. Increased furnace pressure causes the flame in the furnace to blow out around the doors near the exit end and through any other openings in the brickwork at that end. In high temperature furnaces the high gas velocity will cause the brickwork at the entrances into the ducts to wash or burn out. If the ducts are made larger to reduce the velocity of the products of combustion, the Reynolds number is lowered so that the best flame is not obtained. Whether or not this problem of best duct design is recognized by the furnace designer is not certain, but if it has been recognized, it was solved by a compromise on the size of the ducts.

Another disadvantage of the present type of furnace is that a slight cooling effect occurs during reversal of the furnace.

It is an object of my invention to provide a regenerative furnace which overcomes the disadvantages mentioned above.

Another object is to provide a method of operating my improved furnace.

These and other objects will be more apparent after referring to the following specification and attached drawings, in which:

Figure 3 is a plan view of a second embodiment of my invention; and

Figure 4 is a sectional view taken on the line IV—IV of Figure 3.

Figure 1:
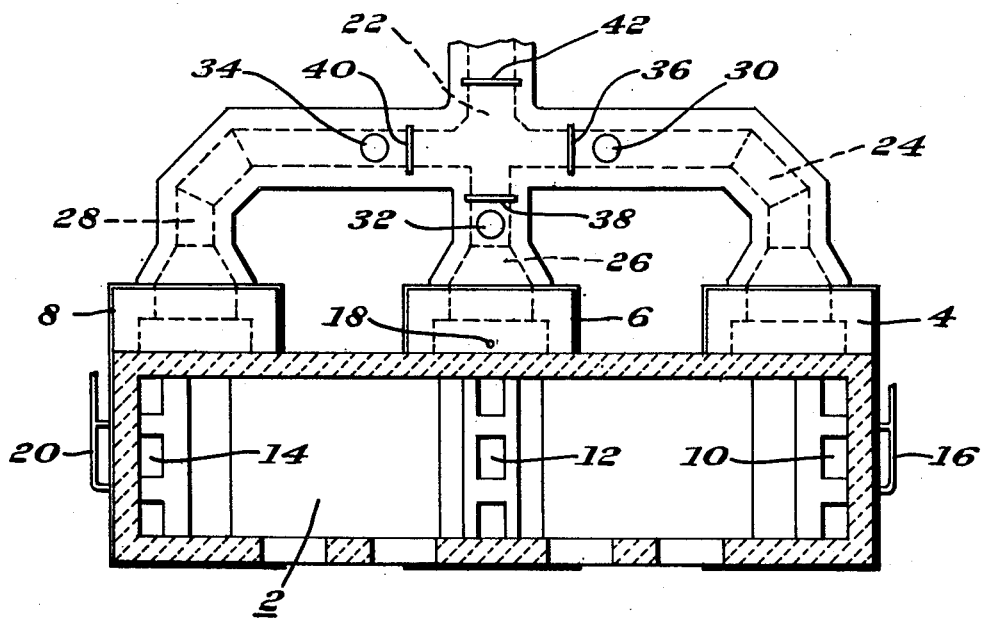
Figure 1 is a view taken on the line I—I of Figure 2.
Figure 2:
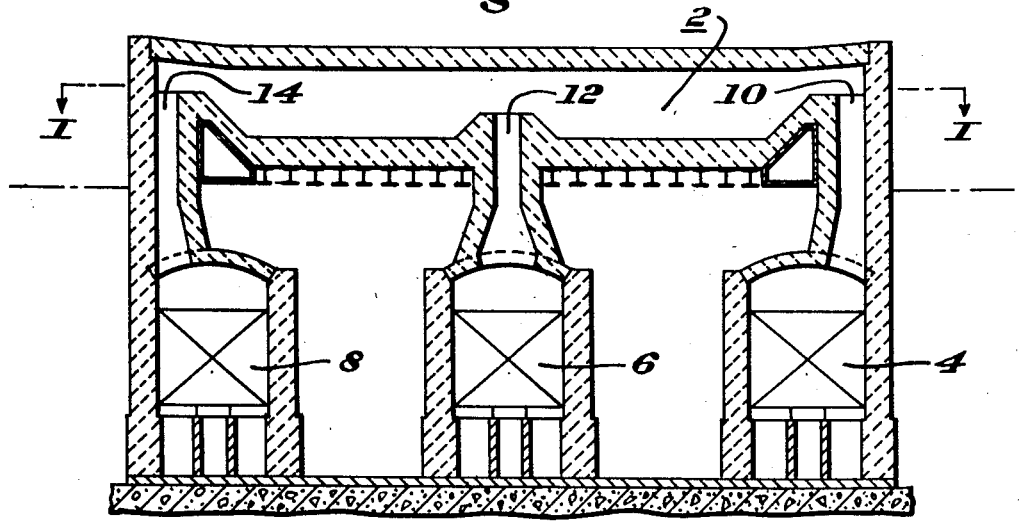
Figure 2 is a sectional view taken through the furnace hearth.

Referring more particularly to Figures 1 and 2 of the drawings, the reference numeral 2 indicates the heating chamber of a regenerative reheating furnace which may be used to heat billets or the like. This heating chamber also acts as a combustion chamber. I have found that if three sets of checker chambers 4, 6 and 8 are provided, the disadvantages of the usual type of regenerative furnace are eliminated. Leading to the combustion chamber 2 from the checker chambers 4, 6 and 8 are the ducts 10, 12 and 14, respectively. Fuel lines 16, 18 and 20 are provided for supplying fuel to the ducts 10, 12 and 14, respectively. Leading to the main or stack flue 22 from the checker chambers 4, 6 and 8 are branch flues 24, 26 and 28, respectively. Provided in these flues are the air valves 30, 32 and 34, respectively. Between the main flue 22 and the air valves are the valves or dampers 36, 38 and 40, respectively. A valve or damper 42 is provided in the main flue 22 for controlling the flow of flue gas. The sets of checker chambers as well as the ducts and flues leading therefrom are of equal capacity and the ducts 10, 12 and 14 can be designed for maximum efficiency because of the arrangement of the three chambers. The reason for this will be more apparent after considering the following method of operating the furnace. The complete cycle of operation is as follows:

The damper 42 is opened the desired amount, the air valve 30 opened and the damper 36 closed. The air valves 32 and 34 are closed and the dampers 38 and 40 opened. Fuel gas is supplied through line 16 and mixes with the air passing through the duct 10. The products of combustion pass from the combustion chamber 2 through the ducts 12 and 14 to the checker chambers 6 and 8, thus heating the brickwork in the checker chambers. The waste gases then pass through the flues 26 and 28 to the stack flue 22 and hence to the stack or to a waste heat boiler. After a period of time the air valve 30 is closed, the damper 36 opened and the gas 16 shut off. At approximately the same time the air valve 32 is opened, the damper 38 is closed and gas is supplied through the line 18 to the duct 12 where it mixes with the preheated air passing upwardly from the checker chamber 6. The products of combustion pass from the combustion chamber 2 down through the respective ducts to the checker chambers 4 and 8 where the gases heat the checker brick. From here the gases pass through the flues 24 and 28 to the flue 22. After another period of time which is ordinarily the same length as the first period, the air valve 32 is closed, the damper 38 opened and the gas in line 18 shut off. At approximately the same time air valve 34 is opened, the damper 40 closed, and gas is supplied through the line 20 to the duct 14 where it mixes with the preheated air passing upwardly from the checker chamber 8. The products of combustion from chamber 2 pass through the ducts 10 and 12 to the checker chambers 4 and 6 and hence through their respective flues to the main flue 22. After a third period of time the furnace is returned to the first described position in which air is passing through the checker chamber 4. This completes one cycle of operation.

From the foregoing it is seen that, at all times, air enters through one of the ducts while the burned gases are passing out through the other two ducts so that the velocity through the ducts is always the same regardless of whether burned gases or air is passing therethrough. Thus it is possible to design the ducts for maximum efficiency. The air is also preheated to a greater extent because of its lower velocity through the checker chambers and the higher checker chamber temperature resulting from the longer preheat period. Because there is always some combustion taking place in the chamber 2, even during reversals, heat is always being supplied to the chamber 2 so that the chilling effect is greatly reduced or completely eliminated during the reversing cycle.

Figures 3 and 4 show a second embodiment of my invention which is substantially the same as the first embodiment except that it shows the application of the invention to a soaking pit furnace instead of a reheating furnace. A hexagonal hearth 44 is provided for the soaking pits since I have found this shape to be peculiarly adapted for use with my arrangement of checker chambers. The construction of the furnace is otherwise essentially the same as that shown in Figures 1 and 2 and detailed description thereof is not thought necessary. The same reference numerals used in describing the checker chambers and associated ducts, flues and valves of Figures 1 and 2 have been primed to indicate corresponding parts in Figures 3 and 4.

The operation of the furnace is the same as that of the furnace shown in Figures 1 and 2 and will not be repeated here.

While two embodiments of my invention have been shown and described, it will be apparent that other adaptations and modifications may be made without departing from the scope of the following claims.

I claim:

1. A regenerative furnace comprising a combustion chamber, three sets of spaced apart checker chambers of substantially equal capacity, a duct leading from each checker chamber to the combustion chamber, the outlet of the duct from each set of checker chambers facing in a different direction than the outlets of the ducts of the other sets and the sets of checker chambers firing separately in successive order, a main flue, separate flues connecting each checker chamber to the main flue, a valve in each flue, and means for individually controlling the flow of air to each checker chamber.

2. A regenerative furnace according to claim 1 in which the combustion chamber is rectangular with the outlet of the duct from one set of checker chambers being midway of the length of the combustion chamber and the outlets of the ducts of the other two sets being arranged one at each end of the combustion chamber.

3. A regenerative furnace comprising a combustion chamber, three sets of spaced apart checker chambers of substantially equal capacity, a duct leading from each checker chamber to the combustion chamber, said ducts being of equal capacity, the outlet of the duct from each set of checker chambers facing in a different direction than the outlets of the ducts of the other sets and the sets of checker chambers firing separately in successive order, a main flue, separate flues connecting each checker chamber to the main flue, a valve in each flue, and means for individually controlling the flow of air to each checker chamber.

4. A soaking pit furnace comprising a hexagonal combustion chamber, a set of checker chambers arranged at alternate sides of said combustion chamber, the sets of checker chambers being of equal capacity, a duct leading from each checker chamber to the combustion chamber, said ducts being of equal capacity, a main flue, branch flues connecting each checker chamber to the main flue, a valve in each flue, an air inlet in each branch flue between the checker chamber and the valve, and means for individually controlling the flow of air to each checker chamber.

5. The method of operating a regenerative furnace having separate ducts leading from three sets of spaced apart checker chambers of substantially equal capacity to the combustion chamber of the furnace with the outlets of said ducts facing in different directions, which method comprises passing air through the first checker chamber and the duct leading therefrom at such a rate that the flow through the duct will be turbulent, mixing the air with fuel to burn the same, the burnt gases filling said combustion chamber, distributing the burnt gases approximately equally through the second and third checker chambers, discontinuing the flow of air to the first checker chamber after a period of time and passing it through the second chamber at approximately the same rate as air had been passed through the first chamber, mixing the air with fuel to burn the same, the burnt gases filling said combustion chamber, distributing the burnt gases approximately equally between the first and third checker chambers, discontinuing the flow of air to the second checker chamber after a period of time and passing it through the third chamber at approximately the same rate as air had been passed through the first chamber, mixing the air with fuel to burn the same, the burnt gases filling said combustion chamber, and distributing the burnt gases approximately equally between the first and third checker chambers.

CHARLES M. NICHOLS.

REFERENCES CITED

The following references are of record in the file of this patent:

UNITED STATES PATENTS

| Number | Name | Date |
| --- | --- | --- |
| 2,049,477 | Vierow | Aug. 4, 1936 |
| 2,049,478 | Vierow | Aug. 4, 1936 |

OTHER REFERENCES

Pages 345, 346, 347, 348, 349 of Trink "Industrial Furnaces," vol. I, third edition, copyright 1934, published by John Wiley & Sons, New York, New York.